July 2, 1940.    C. D. DAYMUDE    2,206,165
TOBACCO PIPE
Filed June 26, 1939
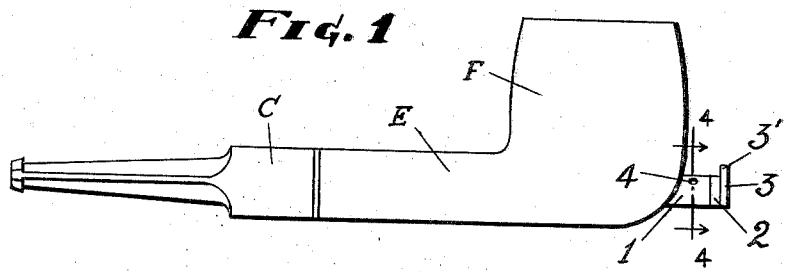
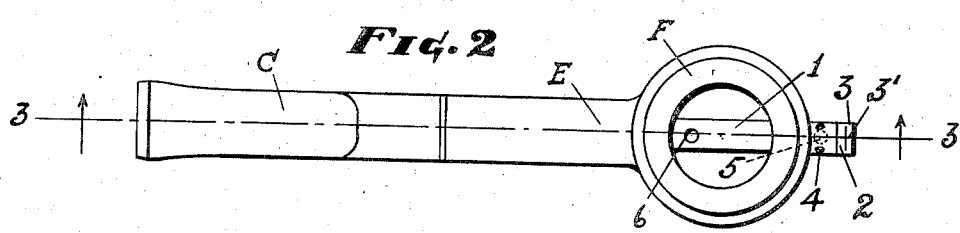
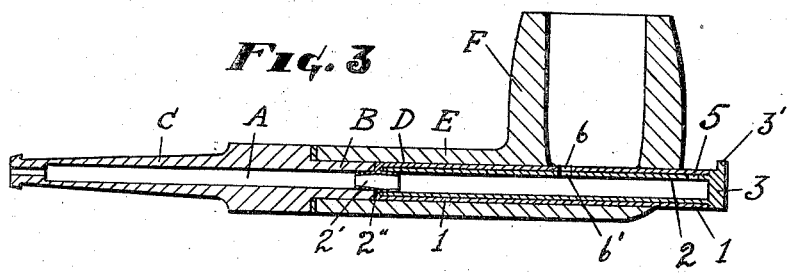
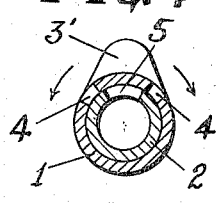 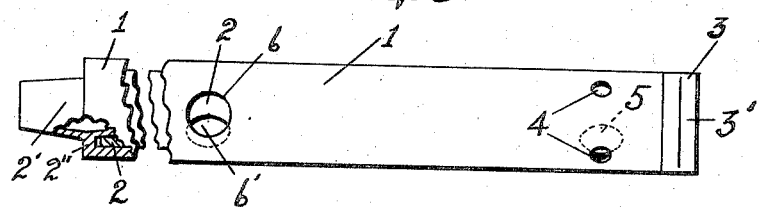
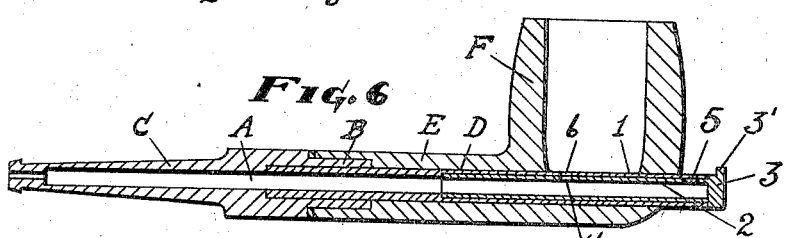
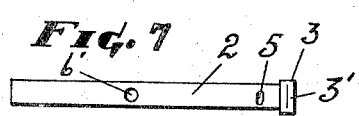
INVENTOR.
CLARENCE D. DAYMUDE
BY U. G. Charles
ATTORNEY.

Patented July 2, 1940

2,206,165

UNITED STATES PATENT OFFICE 2,206,165

TOBACCO PIPE

Clarence D. Daymude, Wichita, Kans.

Application June 26, 1939, Serial No. 281,115

2 Claims. (Cl. 131—223)

My invention relates to improvements in tobacco pipes, and has for its principal object the provision of a valve whereby the volume of draft through the bowl of the pipe may be controlled selectively upon a ratio ranging from an open to a closed portion of the valve.

A further object of my invention is to provide in the structure of the valve an adjustable fresh air inlet as tempering means for smoke drawn from burning tobacco in the bowl.

A still further object of my invention is to provide a convenient cleanout and moisture drain by virtue of the valve arrangement.

A still further object of my invention is to construct a valve that may be applied to standard makes of pipes, or modified conforming to the special pipe designs, in which case, a portion of the valve structure may be integral with the pipe structure.

A still further object of my invention is to provide a valve structure that a portion thereof may be extended through the joint of the mouth piece where it joins the stem of the bowl as reinforcing means at the joint.

A still further object of my invention is to construct and install a valve, the principle of which which is to adhere to the sanitary feature that is desirable with respect to pipe smoking.

These and other objects will hereinafter be more fully explained, reference being had to the accompanying drawing, forming a part of this specification, in which like characters will apply to like parts in the different views.

Referring to the drawing:

Fig. 1 is a side view of a pipe, showing the end of the valve extending outward from its bowl.

Fig. 2 is a top view of Fig. 1.

Fig. 3 is a longitudinal sectional view through the pipe taken on line 3—3 in Fig. 2.

Fig. 4 is a sectional view of the valve taken on line 4—4 in Fig. 1.

Fig. 5 is an enlarged top view of the valve, parts broken away for convenience of illustration.

Fig. 6 is a sectional view through the pipe structure, showing a modification of the valve.

Fig. 7 is a plan view of the rotatable tubular cut-off member, showing a modified form of the aperture adjacent the outer end of the valve structure as a whole.

My invention herein disclosed consists of a sleeve 1 having a tubular cut-off member 2 inserted therein from the outer end of the sleeve, said member rotatably arranged for the purpose later described. Integrally joined to the other end of the sleeve is a nipple 2' having a flange 2" centrally positioned longitudinally of the nipple, the end portion each way from the flange being conical, the outer portion of which is insertible in a duct A at the inner end B of a mouth piece C. The other conical end of said nipple extends a short distance into the hollow of sleeve 1, and being spaced therefrom peripherally to receive the end of cut-off member 2 insertible between said nipple end and sleeve as shown in Figs. 3 and 5, by which means the joint between the end of the cut-off member and the nipple is sealed, while the cut-off member end is free to rotate therein with a smooth running fit.

It will be observed that the said sleeve and end portion B of the mouth piece are insertible with snug engagement in duct D of stem E that is integral with a bowl F of the pipe. It will be understood that duct D is continued across the bottom of the bowl in communication therewith and extending outward therefrom and being in axial alignment with the stem duct as shown in Figs. 2 and 3 as a means to insert the said sleeve and cut-off member fitting snugly therein, while an outer end portion thereof projects from the wall of the bowl as shown in Figs. 1, 2, 3, and 6 as accessible means to the head 3 of the cut-off member, said head having an extension 3' transversely extending from the cut-off member functioning as a crank to turn said member, and furthermore the outward extension of the said valve members is means to provide ports 4 through the sleeve portion external of the bore, while the said cut-off member has a port 5 adapted to communicate with selected ports in the sleeve when turned to register therewith as a fresh air inlet to the cut-off member. By turning said port 5 to a position between said ports 4 will close the vent, at which time ports 6 and 6' in the sleeve and cut-off member, respectively, are brought to register and in communication with the bowl at the bottom thereof as shown in Figs. 2, 3, and 6, and all of said ports may be partially closed by turning of the cut-off member as shown in Fig. 5; furthermore, all of said ports may be closed by turning the cut-off member sufficiently to position port 5 outward from either of said ports 4.

It will now be seen that the said ports as positioned in the sleeve and cut-off member is means to provide exclusive draft through the bowl or permit cool air entering external of the bowl simultaneously; furthermore to adjust the amount of fresh air desired and to restrict a draft to a desired proportion through the bowl of the pipe.

In Fig. 6 is shown a modification of the valve structure in which it will be seen that the said sleeve 1 is reamed from the outer end to near the center thereof to receive the said cut-off member 2 fitting smoothly therein, by which means the diameter of the bore is maintained, although the feature of reaming may be omitted, in which case the diameter of the cut-off member bore will be slightly reduced, but however the length of the said sleeve is increased to extend through the connecting joint of the mouthpiece and the stem of the pipe as reinforcing means therefor, and the said port 5, being elongated transverse to the cut-off body portion, whereby the said cut-off member may be moved longitudinally without entirely closing the port in the hollow of the bowl. The valve, being thus modified, would permit telescopic engagement to open and close the fresh air inlet without complete interruption of suction through the bowl of burning tobacco, and by further movement outward the said ports 6 and 6′ may be closed completely, the function of which is equal to the turning movement above described. The said modification as arranged in Fig. 6 will eliminate the nipple above referred to.

A further modification in the pipe structure may be made, wherein the sleeve is omitted, the duct to function in lieu thereof, and there being an aperture communicating with the interior of the bowl as a substitute for the sleeve aperture 6 to function with the valve aperture 6′, and furthermore, a hub shall extend from the bowl in lieu of the sleeve, said hub having like apertures to that provided in the sleeve, and adapted to function in like manner with aperture 5 positioned in the cut-off member, and such other modifications may be made as lie within the scope of the appended claims.

Having fully described my invention what I claim as new and desire to secure by Letters Patent is:

1. In a tobacco pipe, the combination of a hollow bowl for smoking tobacco, a stem integral with the bowl, a mouthpiece connected to the outer end of the stem, said stem and mouthpiece each having a duct in communication with each other, the duct of the stem continuing across the power portion of the bowl outward therefrom and in communication with the bowl, a valve comprising a sleeve insertible in the duct and a cut-off member rotatably positioned in said sleeve, said sleeve and cut-off member being apertured adapted to register with each other and with the interior of the bowl, and a portion of the sleeve and cut-off member extending outward from the bowl of the pipe, the sleeve and cut-off member at their outward extension from the bowl each being apertured, the cut-off member having a head to close the outer end and to abut the end of the sleeve and to function as turning means for the cut-off member, whereby the said apertures, in registry with the interior of the bowl and at the outer end, may be turned to and from registry or partially so as desired, a nipple having two end portions, said portions intermediately carried by the inner end of the sleeve, one end portion of the nipple to engage across the joint where the mouth piece joins the stem, the other end portion of the nipple insertible in the end of the cut-off member, all substantially as shown.

2. In a tobacco pipe, the combination of a hollow bowl, a stem integral with the bowl, a mouthpiece connected to the outer end of the stem, said stem and mouthpiece each having a duct in communication with each other, the duct of the stem continuing across the lower portion of the bowl outward therefrom and in communication with the bowl, a valve comprising a sleeve insertible in the duct and a cut-off member rotatably positioned in said sleeve, said sleeve and cut-off member being apertured and adapted to register with each other and with the interior of the bowl, and a portion of the sleeve and cut-off member extending outward from the bowl of the pipe, the sleeve and cut-off member at their outward extension from the bowl each being apertured, the cut-off member having a head to close the outer end and to abut the end of the sleeve and to function as turning means for the cut-off member, whereby the said apertures, in registry with the interior of the bowl and at the outer end, may be turned to and from registry or partially so as desired, and means to connect the inner end of the sleeve in registry with the duct of the mouthpiece.

CLARENCE D. DAYMUDE.